United States Patent
Yu et al.

(10) Patent No.: US 11,455,018 B2
(45) Date of Patent: Sep. 27, 2022

(54) OPTICAL PROXIMITY SENSOR COMPONENT COMPRISING LIGHT GUIDE

(71) Applicant: HONOR DEVICE CO., LTD., Shenzhen (CN)

(72) Inventors: Junfeng Yu, Xi'an (CN); Tao Wang, Xi'an (CN); Chaoliang Yang, Shenzhen (CN); Xiaoyong Wang, Shenzhen (CN)

(73) Assignee: HONOR DEVICE CO., LTD.

( * ) Notice: Subject to any disclaimer, the term of this patent is extended or adjusted under 35 U.S.C. 154(b) by 0 days.

(21) Appl. No.: 17/261,918

(22) PCT Filed: Jul. 23, 2019

(86) PCT No.: PCT/CN2019/097253
§ 371 (c)(1),
(2) Date: Jan. 21, 2021

(87) PCT Pub. No.: WO2020/024846
PCT Pub. Date: Feb. 6, 2020

(65) Prior Publication Data
US 2021/0311575 A1    Oct. 7, 2021

(30) Foreign Application Priority Data
Aug. 1, 2018 (CN) .......................... 201810862039.2

(51) Int. Cl.
*G06F 1/16* (2006.01)
*G06F 3/046* (2006.01)
(Continued)

(52) U.S. Cl.
CPC .......... *G06F 1/1684* (2013.01); *G06F 1/1626* (2013.01); *G06F 1/1643* (2013.01);
(Continued)

(58) Field of Classification Search
CPC ........ G06F 3/041; G06F 3/0412; G06F 3/013; G06F 3/046; G06F 2203/0338;
(Continued)

(56) References Cited

U.S. PATENT DOCUMENTS 6,087,653 A * 7/2000 Van Schyndel ....... H04M 1/605
250/227.24
10,620,745 B2 * 4/2020 He ......................... H01L 27/323
(Continued)

FOREIGN PATENT DOCUMENTS

CN    101820466 A    9/2010
CN    104079689 A    10/2014
(Continued)

*Primary Examiner* — Darlene M Ritchie
(74) *Attorney, Agent, or Firm* — Rimon PC

(57) ABSTRACT

This application provides an optical proximity sensor component that includes an optical proximity sensor and a light guide body. The light guide body includes a first end face. The light guide body is disposed on the optical proximity sensor, and the light guide body is configured to transfer, to the optical proximity sensor, light that enters from the first end face, and send out, through the first end face, light that is emitted by the optical proximity sensor. No additional connector or supporting component is required in the optical proximity sensor, which has a simple structure and is easy to assemble.

15 Claims, 8 Drawing Sheets

(51) Int. Cl.
*G01S 17/04* (2020.01)
*H04M 1/02* (2006.01)

(52) U.S. Cl.
CPC ............ *G06F 1/1656* (2013.01); *G06F 3/046* (2013.01); *G01S 17/04* (2020.01); *H04M 1/026* (2013.01); *H04M 1/0266* (2013.01); *H04M 2250/12* (2013.01)

(58) Field of Classification Search
CPC ...... G06F 21/32; G06F 1/1686; G06F 1/1643; G06F 1/1684; G06F 1/1626; G06F 1/1656; H04M 1/026; H04M 1/0264; H04M 1/0266; H04M 1/72454; H04M 2250/12; H04M 2250/22; H04M 2203/2094; G01S 17/04
See application file for complete search history.

(56) References Cited

U.S. PATENT DOCUMENTS

| | | | | |
|---|---|---|---|---|
| 2011/0157887 A1* | 6/2011 | Jeong | ...................... | G02B 5/223 362/235 |
| 2012/0037794 A1* | 2/2012 | Lee | ...................... | G01S 7/4816 250/216 |
| 2013/0048837 A1* | 2/2013 | Pope | ...................... | G01J 1/0407 250/214.1 |
| 2013/0329419 A1* | 12/2013 | Fujita | ...................... | G02B 6/0076 362/231 |
| 2014/0354927 A1* | 12/2014 | Kanno | ............... | G02F 1/133504 349/112 |
| 2015/0103272 A1* | 4/2015 | Kokusho | ............... | G02F 1/13338 349/12 |
| 2016/0116664 A1 | 4/2016 | Wheatley et al. | | |
| 2016/0138944 A1* | 5/2016 | Lee | ...................... | G06F 3/041 250/227.11 |
| 2016/0178367 A1* | 6/2016 | Tseng | ...................... | G06F 1/1684 250/206 |
| 2017/0082273 A1* | 3/2017 | Cotte | ...................... | G02B 26/02 |
| 2017/0090608 A1* | 3/2017 | Vieta | ...................... | H04M 1/72454 |
| 2017/0108433 A1 | 4/2017 | Helfmann et al. | | |
| 2017/0126868 A1 | 5/2017 | Evans, V et al. | | |
| 2017/0262134 A1* | 9/2017 | Eriksson | ................. | G06F 3/041 |
| 2018/0045827 A1* | 2/2018 | Yoon | ...................... | G06F 3/011 |
| 2018/0097022 A1* | 4/2018 | Evans | ................... | G02F 1/1333 |
| 2018/0275865 A1* | 9/2018 | Fröjdh | ................... | G06F 3/0304 |
| 2019/0094014 A1* | 3/2019 | Zhang | ................... | G01C 11/02 |
| 2019/0129467 A1* | 5/2019 | Ting | ...................... | G06V 40/1312 |
| 2019/0324142 A1* | 10/2019 | Chen | ...................... | G01S 7/4811 |
| 2020/0266845 A1* | 8/2020 | Kumar | ................. | G06F 1/1637 |
| 2020/0304617 A1* | 9/2020 | Zhang | ................... | H04M 1/0266 |
| 2021/0240298 A1* | 8/2021 | Cotte | ...................... | G06F 3/042 |
| 2021/0311575 A1 | 10/2021 | Yu et al. | | |

FOREIGN PATENT DOCUMENTS

| | | |
|---|---|---|
| CN | 106850898 A | 6/2017 |
| CN | 206559423 U | 10/2017 |
| CN | 108183984 A | 6/2018 |
| CN | 109309738 A | 2/2019 |

\* cited by examiner

OPTICAL PROXIMITY SENSOR COMPONENT COMPRISING LIGHT GUIDE

CROSS-REFERENCE TO RELATED APPLICATIONS

This application is a national stage of International Application No. PCT/CN2019/097253, filed on Jul. 23, 2019, which claims priority to Chinese Patent Application No. 201810862039.2, filed on Aug. 1, 2018. Both of the aforementioned applications are hereby incorporated by reference in their entireties.

TECHNICAL FIELD

The present invention relates to the field of touchscreen electronic device technologies, and in particular, to an optical proximity sensor component and an electronic device.

BACKGROUND

Touchscreen is widely used in the field of electronic technologies, for example, in a product with a display requirement, such as a mobile phone, a wearable device, or navigation. The touchscreen may be operated directly by touching. When a user answers a call on a touchscreen mobile phone, a screen is usually unlocked, and the user's face may touch the touchscreen, easily causing false screen touch. In the prior art, a sensing apparatus is added to a mobile phone with a touchscreen. Usually, the sensing apparatus is placed where a black border of the touchscreen is located, to facilitate the placement of a light hole. The sensing apparatus is electrically connected to a mainboard of the mobile phone. When the sensing apparatus detects that an obstruction approaches the light hole on the screen, the screen is turned off, to prevent a mis-operation from being performed when a user's face touches the screen when the user answers a call. In the prior art, to enable the sensing apparatus to detect a change in light instantly, the sensing apparatus is installed at the back of a touch module. However, the prior art sensing apparatus requires a support structure and a connecting piece connected to a circuit board. Such structure is complex and difficult to assemble, not favored in an existing market with fierce competition.

SUMMARY

The present invention provides an optical proximity sensor component that is easy to assemble and an improved terminal with such optical proximity sensor.

An embodiment of the present invention provides an optical proximity sensor component, which is used in a terminal such as a mobile phone to sense infrared light brightness or a distance between infrared light and the terminal, so as to implement control of a circuit mainboard on screen-on and screen-off of a screen. The optical proximity sensor component includes an optical proximity sensor and a light guide body. The light guide body includes a first end face. The light guide body is fixed on the optical proximity sensor, and the light guide body is configured to transfer, to the optical proximity sensor, light that enters from the first end face, and send out, through the first end face, light that is emitted by the optical proximity sensor. The light guide body in this embodiment is a cylinder. The optical proximity sensor uses the light guide body to transfer light. The light guide body may be designed based on an actual required size, and may be manufactured as a standard component. When being installed in a mobile phone, the optical proximity sensor is directly installed on a circuit mainboard, and the light guide body may be directly in contact with a light hole on a screen, and is responsible for transferring light. In this way, there is no need to design additional support structures, no additional sensor circuit board is required, and no intermediate connecting piece is even required, thereby implementing easy assembly and reducing production time.

Further, the light guide body includes a second end face disposed opposite to the first end face, a light-shielding separating rib is disposed inside the light guide body, the light-shielding separating rib extends from the first end face to the second end face, the light-shielding separating rib divides the light guide body into a first light guide part and a second light guide part, the first light guide part is configured to guide, into the optical proximity sensor, light that enters from the first end face, and the second light guide part is configured to guide, out of the first end face, light that is emitted by the optical proximity sensor. The light-shielding separating rib is disposed approximately on a middle line of the light guide body along a length direction of the light guide body, to divide the light guide body into two independent light guide parts, thereby preventing the scenario in which the light reflected back during emission of the light emitted by the optical proximity sensor is absorbed by the optical proximity sensor by mistake, and ensuring that the light entering from the first end face does not enter the second light guide part. The light-shielding separating rib is integrally formed with the first light guide part and the second light guide part of the light guide body. The light-shielding separating rib may be made of metal, or plastic that is dark and does not transmit light. When the light-shielding separating rib is made of a metal material, strength of the light guide body can be enhanced.

The optical proximity sensor includes a light sensing module and a light emitting module that is connected to the light sensing module. The light sensing module is opposite to the first light guide part, and the light emitting module is opposite to the second light guide part. Light emitted by the light emitting module does not enter the light sensing module during emission, therefore, the optical proximity sensor does not perform incorrect determination. In addition, it can be ensured that light entering from the first end face is completely absorbed by the sensing module, thereby ensuring light sensing performance of the sensing module, and avoiding crosstalk with the emitted light.

In this embodiment, an end of the light-shielding separating rib near the first end face is a bent section. The bent section bends towards the second light guide part, to form a light guide slope facing the first end face, where the light guide slope is configured to guide light entering the first end face into the first light guide part. When the light guide body receives the light reflected back from the outside, the light guide slope can direct the light incident to the first end face from the outside to enter the first light guide part, thereby enhancing light transfer efficiency and further increasing the sensitivity of the light sensing module.

Further, the light-shielding separating rib is made of a metal material, thereby enhancing the strength of the light guide body.

The light guide body is made of a transparent light guide material, for example, an infrared high-transmittance material.

Further, the light guide body includes an outer peripheral surface. The first end face and the second end face are separately connected to the outer peripheral surface, and the outer peripheral surface is a light shielding surface. The light shielding surface can ensure that the light entering the light guide body is all used for work, thereby increasing the light intensity of the transferred light and further improving sensitivity of the optical proximity sensor.

Further, a light converging layer is disposed on the first end face, and the light converging layer is configured to converge outside light to the first end face and transfer the outside light to the light guide body. This enhances light transfer efficiency and further increases the sensitivity of the light sensing module.

Further, a light converging layer is disposed in the first light guide part, and configured to converge light entering the light guide body and then transfer the light to the optical proximity sensor. This ensures light transfer efficiency.

In this embodiment, the optical proximity sensor includes a working face, the light guide body is fixedly connected to the working face through the second end face, and the light transferred by the light guide body passes through both the working face and the second end face. The working face may be surfaces of the light emitting module and the light sensing module, or may be a transparent surface of an apparatus that accommodates the light emitting module and the light sensing module. Emitted light of the light emitting module is emitted through the working face, enters the light guide body from the second end face, and then is transferred out from the first end face. A transmission path is comparatively short, thereby improving light transfer efficiency.

The area of the working face is greater than or equal to the area of the second end face. Provided that light transfer is not affected, the dimension of the light guide body in a transverse direction may be further reduced as much as possible.

In an implementation, a light shielding plate is disposed at a peripheral edge of the second end face of the light guide body, a slot is disposed at a peripheral edge of the working face, the light shielding plate is inserted into the slot, and the second end face and the working face are in contact with each other. The light guide body and the optical proximity sensor are fixed by using the light shielding plate and the slot, thereby facilitating detaching of the light guide body and the optical proximity sensor, and facilitating replacement. The working face and the second end face are in contact with each other, thereby enhancing light utilization, and preventing light leakage before light enters the light guide body.

In another implementation, the light guide body and the optical proximity sensor are fixedly connected using an optical adhesive. This can play a role of fixing the light guide cylinder, and can also implement light transfer.

An embodiment of the present invention provides an electronic device, including a housing, a circuit board accommodated in the housing, a touchscreen disposed on a side of the housing, and the optical proximity sensor component, where there is space between a non-display area at one end of the touchscreen and the circuit board, a gap is disposed at a position opposite to the space in the non-display area, the optical proximity sensor component is accommodated in the space, the optical proximity sensor in the optical proximity sensor component is fixed to and electrically connected to the circuit board, the light guide body supports the screen and is fixed to the screen by using the first end face, and the first end face and the gap are disposed completely opposite to each other. The electronic device in this embodiment of the present invention may be an electronic product such as a mobile phone, a palmtop computer, or a smartwatch. The light guide body can not only implement screen-off and screen-on to save power and avoid a touch, but also work as the housing to support the screen. In this way, no additional step needs to be disposed in the housing to support the screen, thereby reducing the width of a part that is of the non-display area and that is in contact with the step, that is, implementing a narrow bezel. In addition, a sectional area of the light guide cylinder may also be within a control range, thereby further ensuring that the non-display area of the screen has a small width. Further, the optical proximity sensor may be directly installed on the circuit board, thereby ensuring circuit stability, not requiring an intermediate connecting piece, and eliminating a need of disposing a supporting piece to push the sensor against the back of the screen. In this case, the light guide body can also be in contact with outside light at a shortest distance, thereby ensuring sensitivity of the optical proximity sensor.

The first end face of the light guide body and the non-display area of the touchscreen are fixed to each other by using an optically clear adhesive. The housing includes a side wall, and the light guide body and an inner surface of the side wall are attached to each other using glue. This ensures robustness of the optical proximity sensor component and light transmittance.

In an implementation, the housing includes a side wall. An inner surface of the side wall extends towards an interior of the housing to a step, and the step and the light guide body jointly support the touchscreen. This ensures that there is sufficient supporting force to support the screen and creates a stable assembly.

The optical proximity sensor component according to the present invention uses the light guide body to transfer light emitted and received by the optical proximity sensor, and can be directly installed on a circuit board of an electronic product, without the need of a connecting piece or a supporting piece, featuring a simple structure and making it easy to assemble.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely some of all possible embodiments of the present invention. Other embodiments obtained by a person of ordinary skill in the art based on the embodiments of the present invention without creative efforts shall fall within the protection scope of the present invention.

Figure 1:
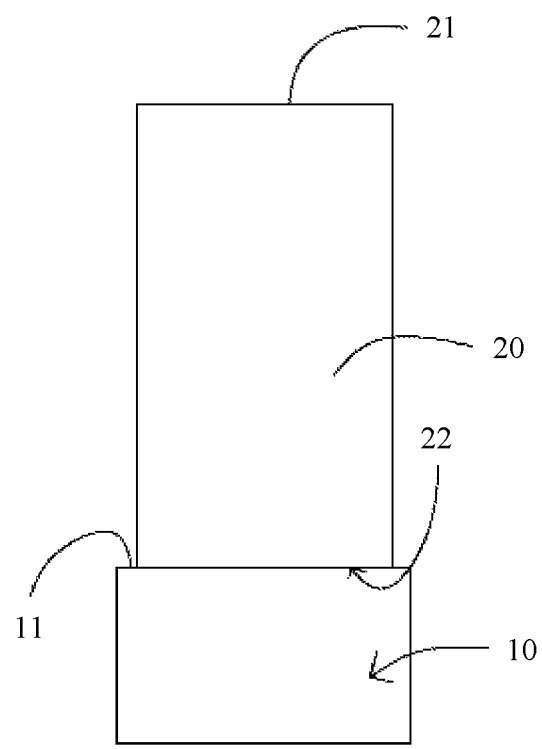
FIG. 1 is a schematic plan view of an optical proximity sensor component according to a first embodiment of the present invention.

Referring to FIG. 1, an embodiment of the present invention provides an optical proximity sensor component. The optical proximity sensor is used in an electronic product with a touchscreen such as a mobile phone, and is used to sense infrared light brightness or a distance between infrared light and the product, so as to implement the control of a circuit mainboard to perform screen-on and screen-off of a screen. The optical proximity sensor component includes an optical proximity sensor 10 and a light guide body 20. The light guide body 20 in this embodiment is a cylinder made of a transparent material. In a first embodiment of the present invention, the light guide body 20 includes a first end face 21 and a second end face 22 disposed opposite to the first end face 21. The light guide body 20 is fixed on the optical proximity sensor 10, and the light guide body 20 is configured to transfer, to the optical proximity sensor 10, light that enters from the first end face 21, and send out, through the first end face 21, light that is emitted by the optical proximity sensor 10. Specifically, the optical proximity sensor 10 includes a working face 11, and the light guide body 20 is fixedly connected to the working face 11 through the second end face 22. An area of the working face 11 is greater than or equal to an area of the second end face 22. Provided that light transfer is not affected, a dimension of the light guide body 20 in a transverse direction (a cross-sectional area) may be further reduced as much as possible. The light that enters the light guide body 20 from the first end face 21 enters the optical proximity sensor 10 through the second end face 22 and the working face 11. The light that is emitted by the optical proximity sensor 10 is emitted through the working face 11, enters the light guide body from the second end face 22, and is emitted through the first end face 21.

The optical proximity sensor 10 according to the present invention uses the light guide body 20 to transfer light. The light guide body 20 may be designed based on an actual required size, and may be manufactured as a standard component. When being installed in a mobile phone, the optical proximity sensor 10 is directly installed on a circuit mainboard, and the light guide body 20 may be directly in contact with a light hole on a screen, and is responsible for transferring light between the outside and the optical proximity sensor. In this way, there is no need to design additional support structure, no additional sensor circuit board is required, and no intermediate connecting piece is even required, thereby simplifying assembling process and reducing production time. The light guide body 20 is made of a transparent light guide material, for example, an infrared high-transmittance material.

Figure 2:
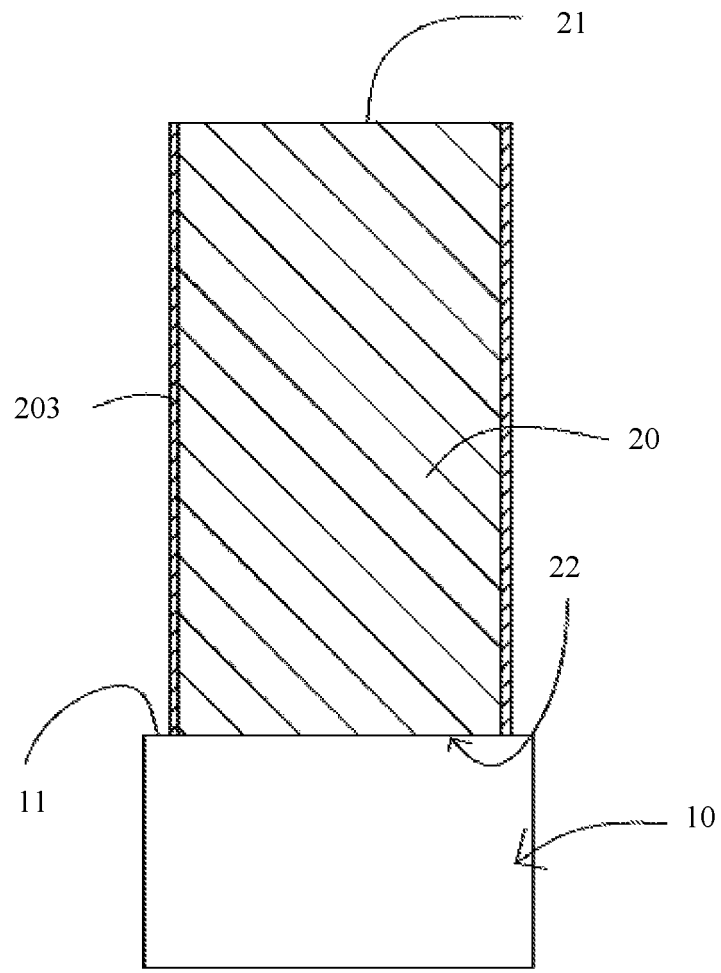
FIG. 2 is a schematic sectional view of a light guide body that is of the optical proximity sensor component shown in FIG. 1 and that is in an implementation, where section display is provided only for the light guide body.

FIG. 2 is a schematic sectional view of a partial structure of an optical proximity sensor component. In an implementation, the light guide body 20 includes an outer peripheral surface 203. The first end face 21 and the second end face 22 are separately connected to the outer peripheral surface 203. The outer peripheral surface 203 is a light shielding surface, and a coating may be disposed on the outer peripheral surface 203 to implement light shielding. Or a light-shielding covering layer may be disposed on the outer peripheral surface 203. The light shielding surface 203 can ensure that substantially all of the light entering the light guide body 20 is used for work, thereby increasing the light intensity of transferred light and further improving the sensitivity of the optical proximity sensor 10.

Figure 3:
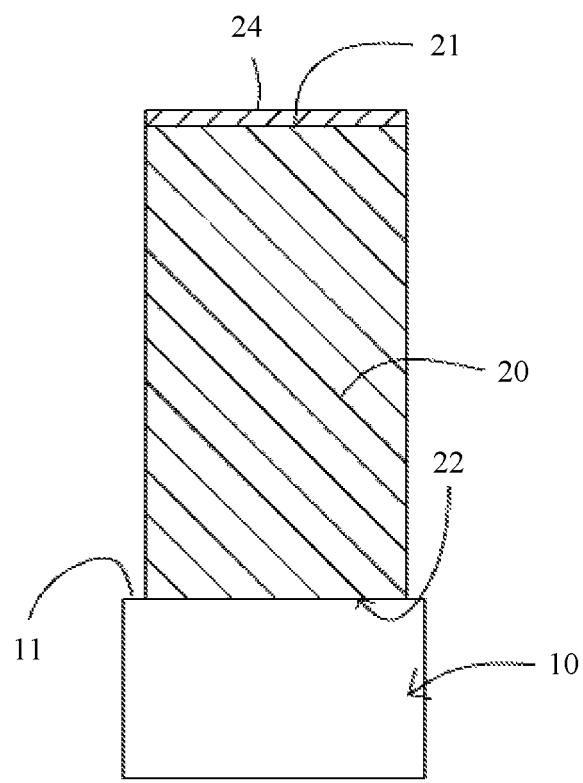
FIG. 3 is a schematic sectional view of a light guide body that is of the optical proximity sensor component shown in FIG. 1 and that is in another implementation, where section display is provided only for the light guide body.

FIG. 3 is another schematic sectional view of a partial structure of an optical proximity sensor component. In an implementation, a light converging layer 24 is disposed on the first end face 21. The light converging layer 24 is coated on the first end face 21, and the light converging layer 24 is configured to converge, to the first end face 21, infrared light reflected back by the outside, and transfer the light to the light guide body 20. This ensures light transfer efficiency, and can further enhance the sensitivity of a light sensing module 14. The outside light mentioned in this specification is light received after infrared light emitted by an optical proximity sensor is reflected back.

Figure 4:
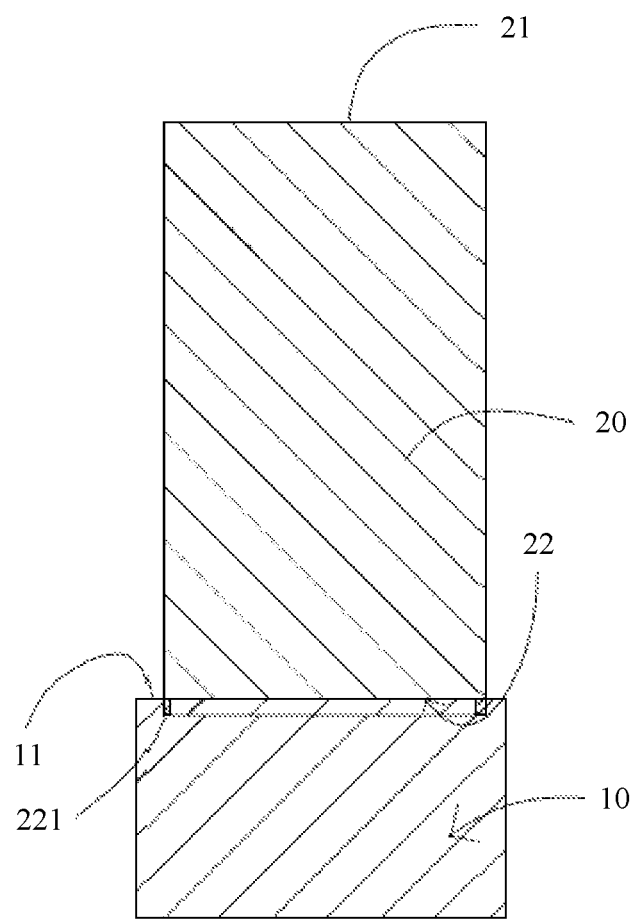
FIG. 4 is a schematic sectional view of the optical proximity sensor component shown in FIG. 1.

In referring to FIG. 4, in an implementation, a light shielding plate 221 is disposed at a peripheral edge of the second end face 22 of the light guide body 20, a slot (not shown in the figure) is disposed at a peripheral edge of the working face 11, the light shielding plate 221 is inserted into the slot, and the second end face 22 and the working face 11 are in contact with each other.

Specifically, the light shielding plate 221 is disposed at the peripheral edge of the second end face 22 in a protruding manner to form an annular retaining wall structure, and the slot is an annular groove disposed at the peripheral edge of the working face 11 in a recessed manner. The light guide body 20 and the optical proximity sensor 10 are fixed by using the light shielding plate 221 and the slot. It may be that the working face 11 and the second end face 22 are in contact with each other, thereby ensuring light utilization and preventing light leakage from occurring before light enters the light guide body 20. In addition, this facilitates detaching of the light guide body 20 from the optical proximity sensor 10 during replacement.

In another implementation, as shown in FIG. 1, the light guide body 20 and the optical proximity sensor 10 are fixedly connected by using an optical adhesive (not shown in the figure).

This secures the light guide body 20, and also facilitates light transfer.

Figure 5:
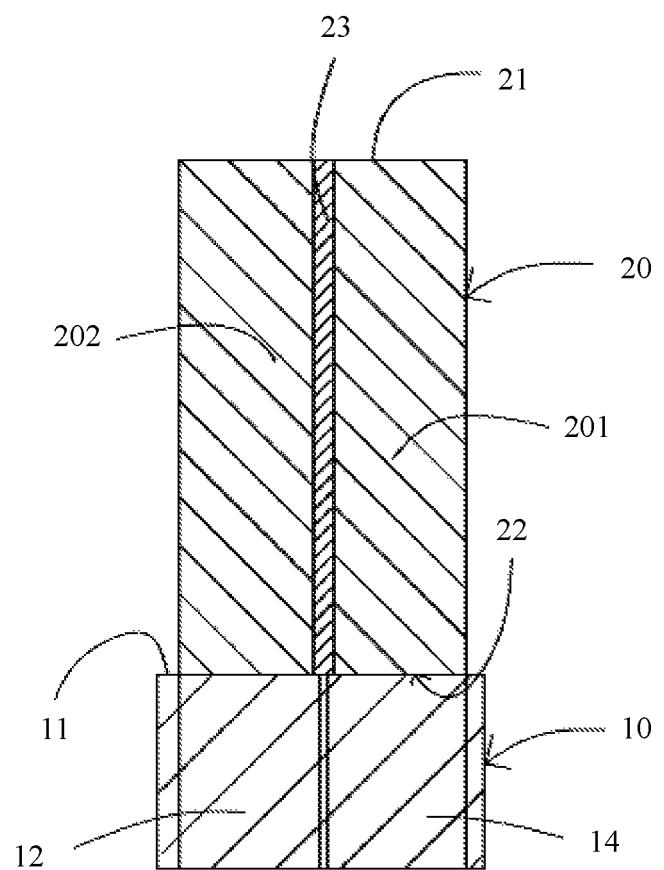
FIG. 5 is a partial schematic sectional view of an optical proximity sensor component according to a second embodiment of the present invention, where section display is provided only for a light guide body, and for an optical proximity sensor, an internal structure is shown.
Figure 6:
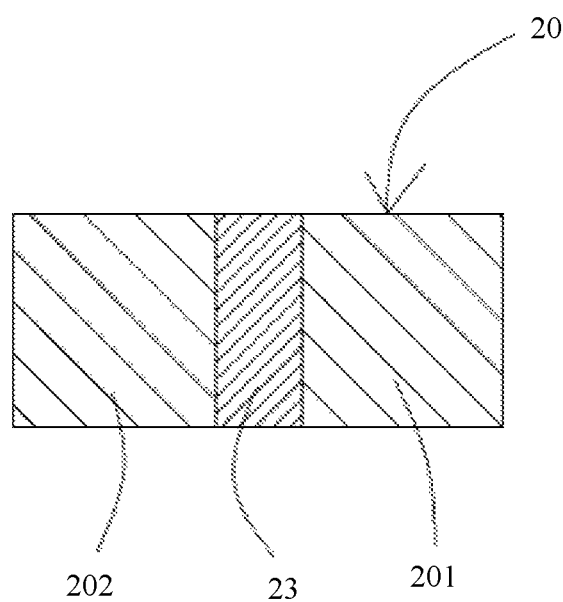
FIG. 6 is a top view of a light guide body of the optical proximity sensor component shown in FIG. 5.

In referring to FIG. 5 and FIG. 6, in a second embodiment of the optical proximity sensor component according to the present invention, based on any one of the foregoing implementations, a light-shielding separating rib 23 is disposed inside the light guide body 20, and the light-shielding separating rib 23 extends from the first end face 21 to the second end face 22. The light-shielding separating rib 23 divides the light guide body 20 into a first light guide part 201 and a second light guide part 202. The first light guide part 201 is configured to guide, into the optical proximity sensor 10, light that enters from the first end face 21, and the second light guide part 202 is configured to guide, out of the first end face 21, light that is emitted by the optical proximity sensor 10. The first end face 21 is formed by the ends of the first light guide part 201 and the second light guide part 202 that face a same direction. The two ends are flush with each other. The end of the first light guide part 201 that forms the first end face may be higher than the end of the second light guide body 201.

In this embodiment, the light-shielding separating rib 23 is roughly disposed at the middle line of the light guide body 20 along a length direction of the light guide body 20, to divide the light guide body 20 into two independent light guide parts, thereby preventing the light reflected back during emission of infrared light emitted by the optical proximity sensor 10 from being absorbed by the optical proximity sensor 10 by mistake, and ensuring that the light entering from the first end face 21 does not enter the second light guide part 202. The light-shielding separating rib 23 is integrally formed with the first light guide part 201 and the second light guide part 202 of the light guide body 20. The light-shielding separating rib 23 may be made of metal or plastic, preferably plastic that is dark and does not transmit infrared light. When the light-shielding separating rib 23 is made of a metal material, the strength of the light guide body 20 in the length direction can be enhanced. In this embodiment, the light-shielding separating rib 23 is a plastic part that does not transmit light. The surfaces of two opposite ends of the light-shielding separating rib 23 are separately flush with the first end face 21 and the second end face 22, to ensure that the first light guide part 201 and the second light guide part 202 are isolated.

The optical proximity sensor 10 includes a light sensing module 14 and a light emitting module 12 that is connected to the light sensing module 14. The light sensing module 14 is opposite to and interfaces with the first light guide part 201, and the light emitting module 12 is opposite to and interfaces with the second light guide part 202. Outside light that enters the light guide body 20 through the first end face 21 enters the first light guide part 201, passes through the working face 11 after being transferred by the first light guide part 201, and enters the light sensing module 14. When sensing the existence of the light, the light sensing module 14 sends a signal to an electrically controlled part such as a circuit board to control the screen. When the screen is lit, the light emitting module 12 emits infrared light. The infrared light is transferred by the second light guide part 202 out through the first end face 21. The light emitted by the light emitting module 12 does not enter the light sensing module 14 during emission, therefore, the optical proximity sensor 10 does not performs incorrect determining. In addition, it can be ensured that the light entering from the first end face 21 is absorbed by the sensing module, thereby ensuring the light sensing performance of the sensing module and avoiding crosstalk with the emitted light. In this embodiment, light transferred by the light guide body 20 passes through both the working face 11 and the second end face 22. The working face 11 may be surfaces of the light emitting module 12 and the light sensing module 14, or may be a transparent surface of an apparatus that accommodates the light emitting module 12 and the light sensing module 14. Emitted light of the light emitting module 12 is emitted through the working face 11, enters the light guide body 20 from the second end face 22, and then is transferred out from the first end face 21. The transmission path is comparatively short, thereby improving light transfer efficiency.

Further, a light converging layer (not shown in the figure) is disposed in the first light guide part 201. The light converging layer is parallel to the first end face 21, and the light converging layer is configured to converge light entering the light guide body 20 and then transfer the light to the optical proximity sensor 10. This ensures light transfer efficiency.

Figure 7:
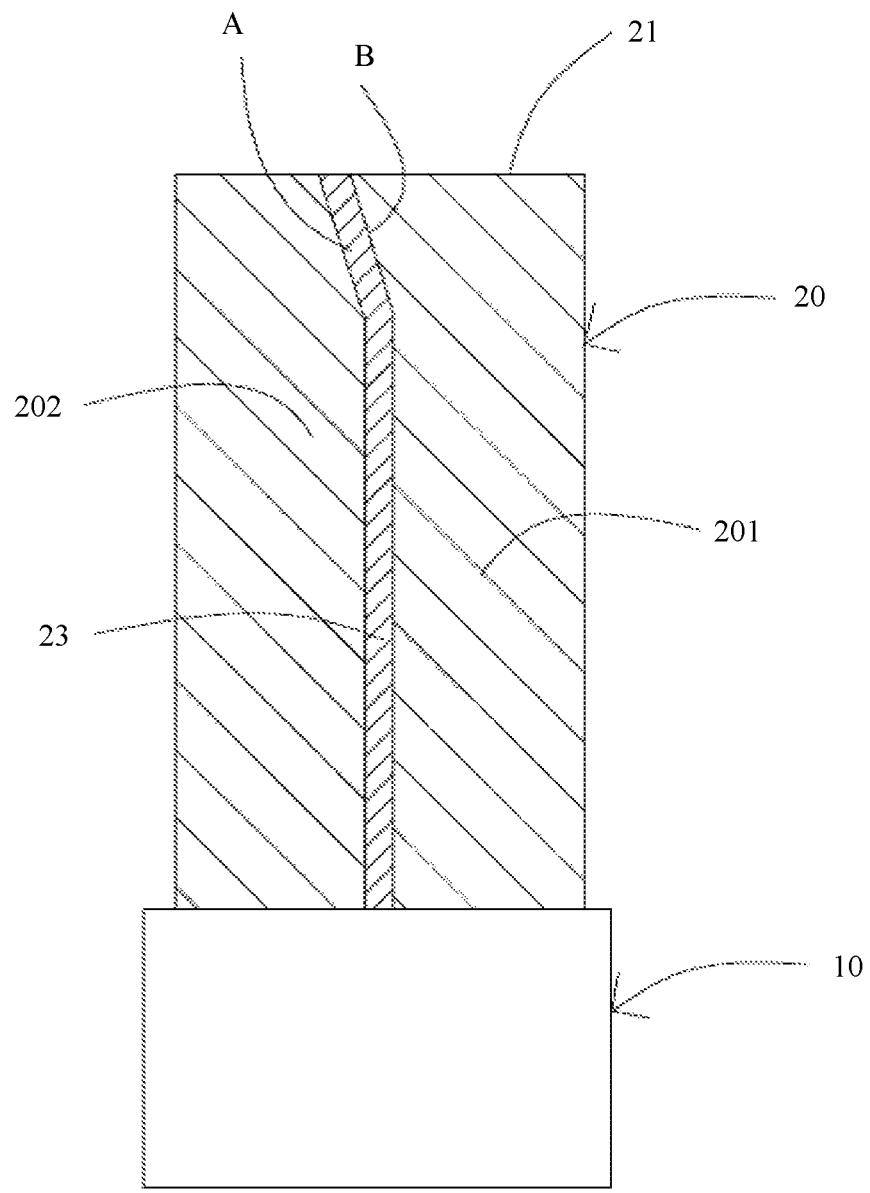
FIG. 7 is a schematic diagram of the light guide body in FIG. 5 in another implementation.

In referring to FIG. 7, in an implementation, an end of the light-shielding separating rib 23 that is near the first end face 21 is a bent section A, and the bent section A bends towards the second light guide part 202, to form a light guide slope B facing the first end face 21, where the light guide slope B is configured to guide light entering the first end face 21 into the first light guide part 201. When the light guide body 20 receives light reflected back from the outside, the light guide slope B can enable light incident to the first end face 21 from the outside to enter the first light guide part 201, thereby enhancing light transfer efficiency and further improving sensitivity of the light sensing module 14.

Figure 8:
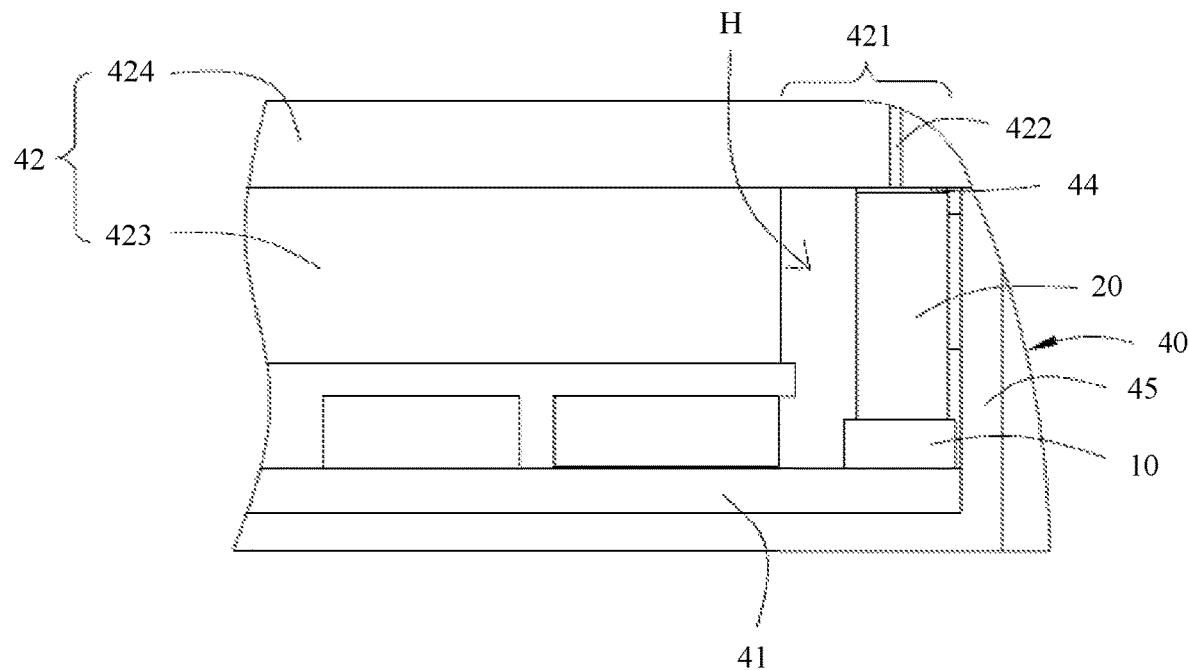
FIG. 8 is a schematic diagram of an internal structure of an electronic device in an embodiment according to the present invention.

Referring to FIG. 8, an embodiment of the present invention provides an electronic device. The electronic device may be an electronic product such as a mobile phone, a palmtop computer, or a smartwatch. In this embodiment, a mobile phone is used as an example for description. The electronic device includes a housing 40, a circuit board 41 accommodated in the housing 40, a touchscreen 42 disposed on a side of the housing 40, and the optical proximity sensor component. There is space H between a non-display area 421 at one end of the touchscreen 42 and the circuit board 41, a gap 422 is disposed at a position opposite to the space H in the non-display area 421, the optical proximity sensor component is accommodated in the space H, the optical proximity sensor 10 is fixed to and electrically connected to the circuit board 41, the light guide body 20 supports the screen and is fixed to the screen by using the first end face 21, and the first end face 21 and the gap 422 are disposed opposite to each other.

Specifically, the touchscreen 42 includes an LCD module 423 and a touch module 424 that covers the LCD module 423. The housing 40 includes a baseboard that bears the circuit board 41 and the touchscreen 42, and a side wall 45 disposed at a peripheral edge of the baseboard. In a thickness direction of the electronic device, the baseboard, the circuit board 41, the LCD module 423, and the touch module 424 are disposed sequentially. The non-display area 421 is an end of the touch module 424 that extends from the LCD module, and the gap 422 is disposed in the non-display area. A peripheral edge of the touch module 422 is connected and fixed to the side wall 45, and the light guide body 20 is supported on the touch module 424.

The light guide body 20 can not only implement screen-off and screen-on to save power and avoid a touch, but also work as the housing 40 to support the screen 42. In this way, no additional step needs to be disposed in the housing 40 to support the screen 42, thereby eliminating the width of the part of the non-display area 421 that is in contact with the step, that is, resulting in a narrower bezel. In addition, a sectional area of a light guide cylinder may also be within a control range, thereby further ensuring that the non-display area 421 of the screen has a small width. Further, the optical proximity sensor 10 may be directly installed on the circuit board 41, thereby ensuring circuit stability, eliminating the need of an intermediate connecting piece and a supporting piece to push the sensor against the back of the screen. In this case, the light guide body 20 can also be in contact with the outside light at a shortest distance, thereby ensuring the sensitivity of the optical proximity sensor 10.

The first end face 21 of the light guide body 20 and the non-display area 421 of the touchscreen 42 are fixed to each other by using an optically clear adhesive 44. The light guide body 20 and an inner surface of the side wall 45 are fixed to each other using glue. This ensures the robustness of the optical proximity sensor 10 component, and ensures light transmittance.

Figure 9:
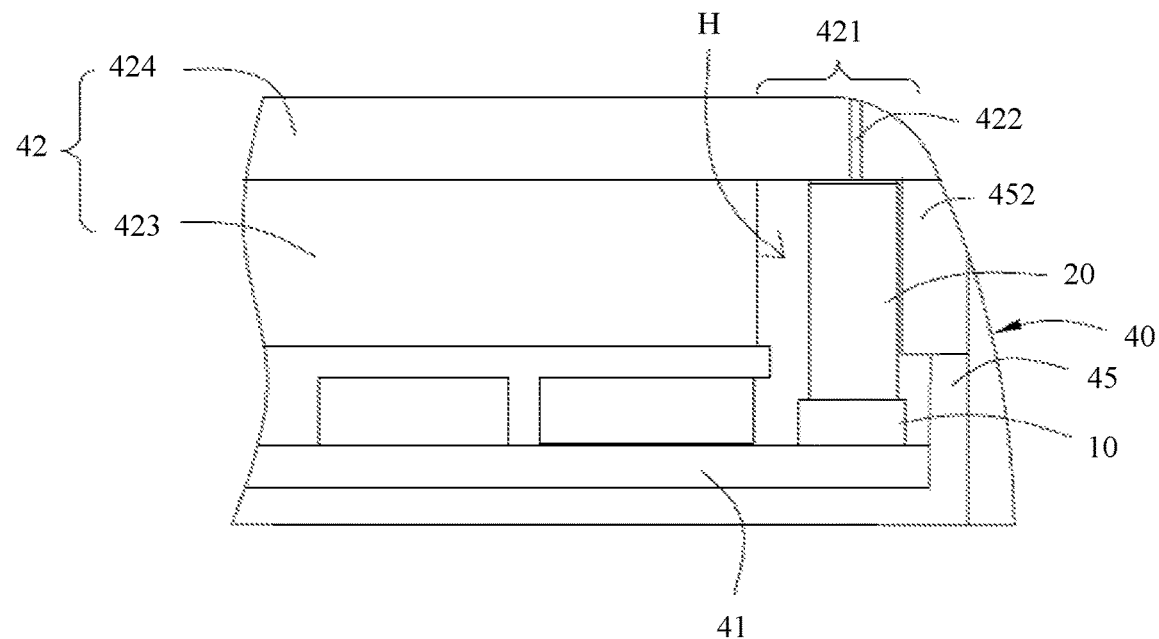
FIG. 9 is a schematic diagram of an internal structure of an electronic device in another embodiment according to the present invention.

Referring to FIG. 9, in an implementation, an inner surface of the side wall 45 of the housing 40 extends towards an interior of the housing 40 to a step 452, and the step 452 and the light guide body 20 jointly support the touchscreen 42. This can ensure that there is sufficient supporting force to support the screen 42 and the assembly is stable.

The flowchart described in the present invention is merely one embodiment, and there may be a plurality of modifications to the steps illustrated in the present invention without departing from the spirit of the present invention. For example, these steps may be performed in a different order, or some steps may be added, deleted, or modified. A person of ordinary skill in the art may understand that all or some of the procedures used for implementing the foregoing embodiments and equivalent variations made according to the claims of the present invention shall still fall within the scope of the present invention.

What is claimed is:

1. An optical proximity sensor component, comprising an optical proximity sensor and a light guide body, wherein the light guide body comprises a first end face and a second end face opposite to the first end face, the light guide body is disposed on the optical proximity sensor, and the light guide body is configured to transfer, to the optical proximity sensor, light that enters from the first end face, and send out, through the first end face, light that is emitted by the optical proximity sensor;

wherein the optical proximity sensor comprises a working face, and a slot is formed at a peripheral edge of the working face; and wherein a light shielding plate is inserted into the slot, and the second end face and the working face are in contact with each other.

2. The optical proximity sensor component according to claim 1, wherein a light-shielding separating rib is disposed inside the light guide body, the light-shielding separating rib extends from the first end face to the second end face, the light-shielding separating rib divides the light guide body into a first light guide part and a second light guide part, the first light guide part is configured to guide, into the optical proximity sensor, light that enters from the first end face, and the second light guide part is configured to guide light that is emitted by the optical proximity sensor out of the optical proximity sensor.

3. The optical proximity sensor component according to claim 2, wherein the optical proximity sensor comprises a light sensing module and a light emitting module that is connected to the light sensing module, the light sensing module interfaces with the first light guide part, and the light emitting module interfaces with the second light guide part.

4. The optical proximity sensor component according to claim 2, wherein an end of the light-shielding separating rib that is near the first end face is a bent section, and the bent section bends towards the second light guide part to form a light guide slope facing the first end face, wherein the light guide slope is configured to guide light entering the first end face into the first light guide part.

5. The optical proximity sensor component according to claim 3, wherein the light-shielding separating rib is made of metal.

6. The optical proximity sensor component according to claim 2, wherein the light guide body comprises an outer peripheral surface, the first end face and the second end face are separately connected to the outer peripheral surface, and the outer peripheral surface is a light shielding face.

7. The optical proximity sensor component according to claim 2, wherein a light converging layer is disposed on the first end face, and the light converging layer is configured to converge outside light to the first end face and transfer the outside light to the light guide body.

8. The optical proximity sensor component according to claim 3, wherein a light converging layer is disposed in the first light guide part, and configured to converge light entering the light guide body and then transfer the light to the optical proximity sensor.

9. The optical proximity sensor component according to claim 3, wherein the light guide body is fixedly connected to the working face through the second end face, and light transferred by the light guide body passes through both the working face and the second end face.

10. The optical proximity sensor component according to claim 2, wherein the light guide body and the optical proximity sensor are attached to each other using an optical adhesive.

11. The optical proximity sensor component according to claim 3, wherein the light-shielding separating rib is integrally formed with the first light guide part and the second light guide part of the light guide body.

12. An electronic device, comprising a housing, a circuit board accommodated in the housing, a touchscreen disposed on a side of the housing, and an optical proximity sensor component, wherein the optical proximity sensor component comprises an optical proximity sensor and a light guide body, wherein the light guide body comprises a first end face, the light guide body is affixed on the optical proximity sensor, and the light guide body is configured to transfer, to the optical proximity sensor, light that enters from the first end face, and send out, through the first end face, light that is emitted by the optical proximity sensor, and wherein there is a space between a non-display area at one end of the touchscreen and the circuit board, a gap is formed at a position opposite to the space in the non-display area, the optical proximity sensor component is accommodated in the space, the optical proximity sensor is fixed to and electrically connected to the circuit board, the light guide body supports the screen and is attached to the screen at the first end face, and the first end face and the gap are disposed opposite to each other.

13. The electronic device according to claim 12, wherein the first end face of the light guide body and the non-display area of the touchscreen are attached to each other using an optically clear adhesive.

14. The electronic device according to claim 12, wherein the housing comprises a side wall, and the light guide body and an inner surface of the side wall are attached to each other using glue.

15. The electronic device according to claim 12, wherein the housing comprises a side wall, an inner surface of the side wall extends towards an interior of the housing to a step, and the step and the light guide body jointly support the touchscreen.

* * * * *